United States Patent
Tolia et al.

(10) Patent No.: US 8,762,425 B2
(45) Date of Patent: Jun. 24, 2014

(54) MANAGING A DATA STRUCTURE

(75) Inventors: Niraj Tolia, Mountain View, CA (US); Nathan Binkert, Redwood City, CA (US); Yoshio Turner, San Francisco, CA (US); Jichuan Chang, Sunnyvale, CA (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 335 days.

(21) Appl. No.: 12/906,334

(22) Filed: Oct. 18, 2010

(65) Prior Publication Data
US 2012/0096052 A1  Apr. 19, 2012

(51) Int. Cl.
*G06F 7/00* (2006.01)
*G06F 17/30* (2006.01)
*G06F 13/00* (2006.01)
*G06F 13/28* (2006.01)

(52) U.S. Cl.
CPC .......... *G06F 17/30303* (2013.01); *G06F 17/30* (2013.01)
USPC .......................................... 707/806; 711/161

(58) Field of Classification Search
CPC ........................... G06F 17/30303; G06F 17/30
USPC ................... 707/807, 806; 711/161
See application file for complete search history.

(56) References Cited

U.S. PATENT DOCUMENTS

| 7,356,662 | B2 | | 4/2008 | Shoff et al. | |
|---|---|---|---|---|---|
| 2003/0037248 | A1 | * | 2/2003 | Launchbury et al. | 713/193 |
| 2006/0173885 | A1 | * | 8/2006 | Moir et al. | 707/101 |
| 2006/0282644 | A1 | | 12/2006 | Wong | |
| 2008/0065670 | A1 | * | 3/2008 | Cha et al. | 707/101 |
| 2008/0077783 | A1 | * | 3/2008 | Lu et al. | 713/1 |
| 2009/0094406 | A1 | | 4/2009 | Ashwood | |
| 2009/0182933 | A1 | | 7/2009 | Jang et al. | |
| 2009/0276472 | A1 | * | 11/2009 | Subramanian et al. | 707/203 |
| 2011/0088027 | A1 | * | 4/2011 | Jelvis et al. | 717/174 |
| 2012/0030261 | A1 | * | 2/2012 | Mason et al. | 707/822 |
| 2012/0054156 | A1 | * | 3/2012 | Mason et al. | 707/679 |
| 2012/0089569 | A1 | * | 4/2012 | Mason et al. | 707/639 |
| 2013/0325830 | A1 | * | 12/2013 | Verma et al. | 707/703 |

FOREIGN PATENT DOCUMENTS

JP  2010055139  3/2010

* cited by examiner

*Primary Examiner* — Apu Mofiz
*Assistant Examiner* — Jared Bibbee

(57) ABSTRACT

In a method for managing a data structure in a memory, an accessor to access a version of the data structure is determined, in which the accessor includes a version number and a fat pointer, in which the version number corresponds to the most recent version of the data structure, and wherein the fat pointer is configured to enable for multiple versions of a linked-data structure to be maintained.

16 Claims, 5 Drawing Sheets

MANAGING A DATA STRUCTURE

BACKGROUND

Data structures are generally defined as ways of storing and organizing data in a computer that allows the data to be used efficiently. Recent trends in data storage have led to increased storage of the data structures in non-volatile memories. As such, there has been a growing need to ensure that the data structure is never left in an inconsistent state. However, current processors do not provide the necessary hooks to guarantee data ordering for writes from being flushed from the processor cache to memory.

Conventional processors support a memory fence (mfence) instruction, which guarantees that all memory reads and writes issued before it are completed and globally visible before any reads or writes after the mfence instruction, the visibility is only with respect to the processor's caches. Executing an mfence instruction, however, does not guarantee that all memory writes are propagated to main memory or that the ordering of writes is maintained. One option is to flush all of the cache contents using the write-back and invalidate cache (wbinvd) instruction, however, this significantly harms performance as it also impacts the instruction cache, read-only data, as well as data unrelated to the data structure.

In addition, in conventional mechanisms for updating data structures, a memory controller can reorder writes at a cache line granularity, and data structures are likely to be corrupted in the face of power or software failures. As such, conventional processors and memory controllers are typically unable to guarantee that data structures will not be left in inconsistent states.

BRIEF DESCRIPTION OF THE DRAWINGS

Features of the present invention will become apparent to those skilled in the art from the following description with reference to the figures, in which.

DETAILED DESCRIPTION

For simplicity and illustrative purposes, the present invention is described by referring mainly to an example embodiment thereof. In the following description, numerous specific details are set forth in order to provide a thorough understanding of the embodiments. It will be apparent however, to one of ordinary skill in the art, that the present invention may be practiced without limitation to these specific details. In other instances, well known methods and structures have not been described in detail so as not to unnecessarily obscure the present invention.

Disclosed herein are a method and apparatus for managing a data structure in a memory, for instance, a non-volatile byte-addressable memory. The method and apparatus disclosed herein are configured to build and/or update a data structure in the memory in a manner that substantially overcomes at least some of the drawbacks associated with conventional data storage and organization techniques. More particularly, the data structure disclosed herein is durable, enables atomic updates, is scalable, and is relatively easy to program. In other words, the data structure disclosed herein does not enter into an inconsistent state when an arbitrary failure, such as, power, forced shutdown, external software failures, etc., occurs. In addition, updates to the data structure are atomic regardless of the size of the insert, delete, or update operation. Moreover, the data structure is scalable to arbitrarily-large sizes and do not introduce undue complexity for programmers or introduce excessive restrictions. In addition, the data structures disclosed herein are configured to guarantee that any failure between the correct sequence of operations will not leave the data in an inconsistent state.

Figure 1:
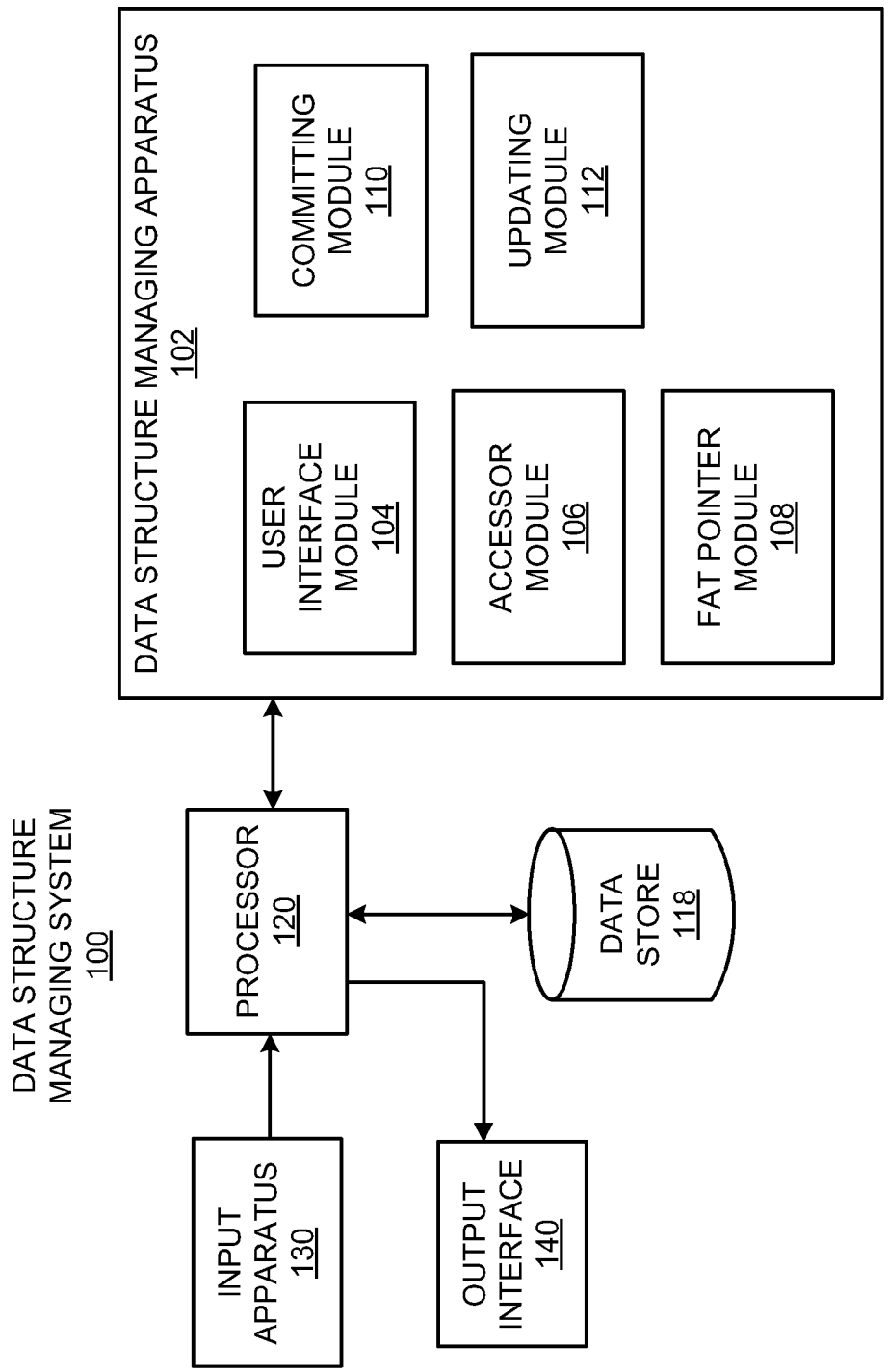
FIG. 1 illustrates a simplified block diagram of a data structure managing system, according to an example embodiment of the present invention.

With reference first to FIG. 1, there is shown a simplified block diagram of a data structure managing system 100, according to an embodiment of the present invention. It should be apparent to those of ordinary skill in the art that the diagram of FIG. 1 represents a generalized illustration and that other components may be added or existing components may be removed, modified or rearranged without departing from a scope of the data structure managing system 100.

The data structure managing system 100 is depicted as including a data structure managing apparatus 102, a processor 120, an input apparatus 130, an output interface 140, and a data store 118. The processor 120 is configured to implement and/or execute the data structure managing apparatus 102. Thus, for instance, the data structure managing system 100 may comprise a computing device and the data structure managing apparatus 102 may comprise an integrated and/or add-on hardware device of the computing device. As another example, the data structure managing apparatus 102 may comprise a computer readable storage device (not shown) upon which is stored one or more computer programs, which the processor 120 is configured to execute.

As further shown in FIG. 1, the processor 120 is configured to receive input from an input apparatus 130. The input apparatus 130 may comprise, for instance, a user interface through which a user may access data, such as, objects, software, applications, etc., that are stored in the data store 118. In addition, or alternatively, a user may interface the input apparatus 130 to supply data into and/or update previously stored data in the data store 118. The input apparatus 130 may also comprise a user interface through which a user may access the one or more versions of the data stored in the data store 118, as outputted through the output interface 140.

According to an embodiment, the data structure managing apparatus 102 is configured to build and/or update a data structure stored in a memory, such as, the data store 118. The data structure, which may comprise a linked data structure, generally comprises elements that enable the most recent versions of data to automatically be accessed and updated. More particularly, the data structure managing apparatus 102 is configured to build the data structure, such that, the most recent version of the data to which the data structure corresponds is relatively easily accessible. The data structure managing apparatus 102 may also be configured to update existing data structures, such as, by updating the accessor, which includes a fat pointer, of the data structure, for instance, as newer versions of data or additional data are stored in the data store 118.

As discussed in greater detail herein below, the data structure is built to include an accessor. The accessor is a region of a memory that points to the root of the most recent version of the data structure and is configured to access a version of the data structure. The accessor also includes a version number and a fat pointer, in which the version number corresponds to the most recent version of the data structure. In addition, there may be only one accessor per data structure and thus, the space overhead for the accessor is relatively small. A fat pointer is an extension of a normal memory pointer and may allow a system to maintain multiple versions of a linked-data structure with low space overhead. For example, a fat pointer is a collection of tuples including multiple versions and pointers, where each tuple contains a version number and a pointer. In addition, the fat pointer is associated with the accessor to connect various data/nodes in the data structure.

Figure 2:
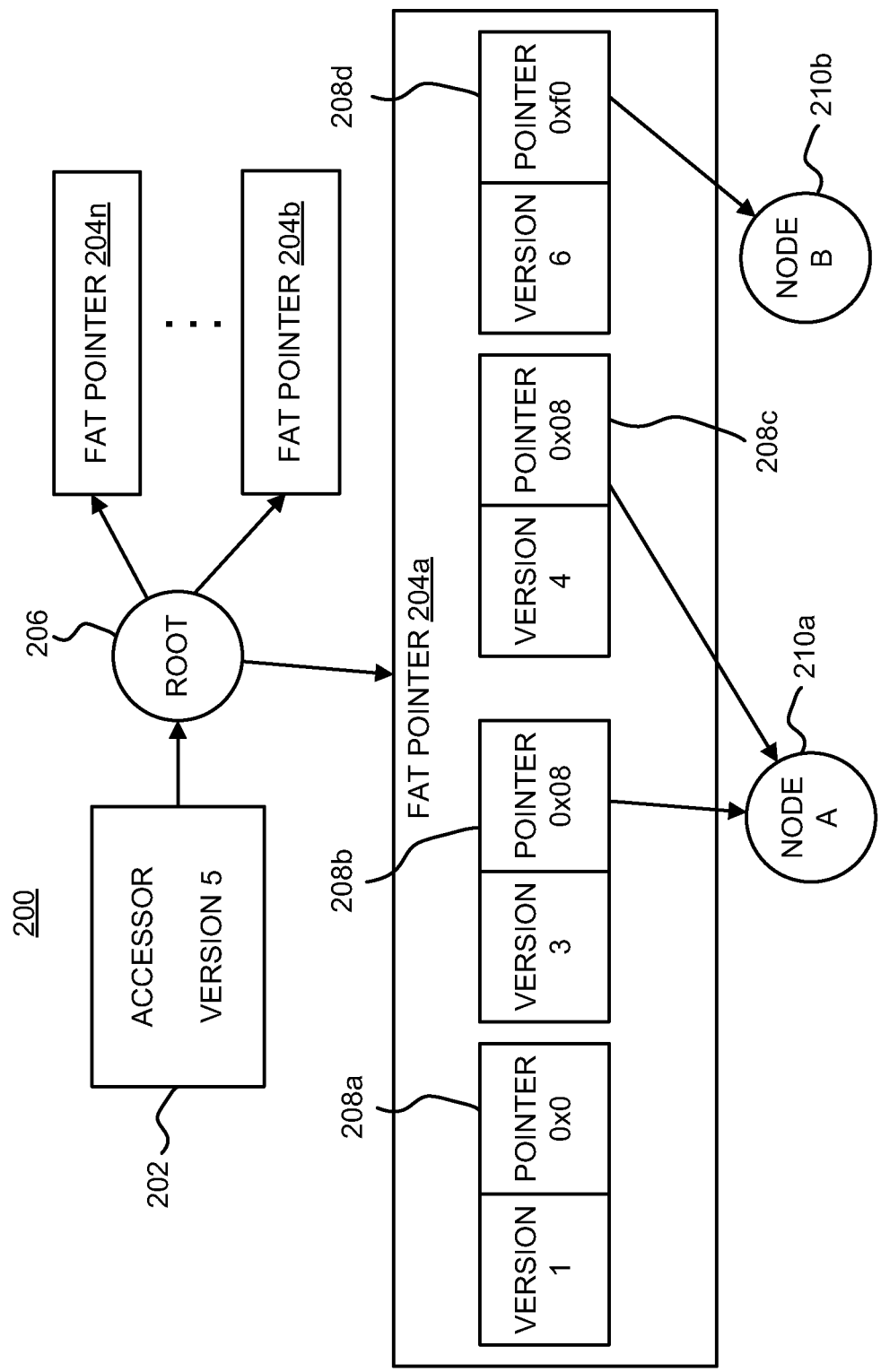
FIG. 2 shows a diagram of an accessor and a plurality of fat pointers, according to an example embodiment of the present invention.

FIG. 2 illustrates a diagram 200 of an accessor 202 and a plurality of fat pointers 204a-204n, according to an embodiment of the present invention. It should be clearly understood that the diagram 200 depicted in FIG. 2 merely represents a generalized illustration and that the features depicted therein are meant to be for purposes of example only.

In an embodiment, an accessor 202 includes a version number and a fat pointer 204a to the root 206 of the consistent data structure, in which the version number corresponds to the most recent version of the data structure. The root 206 may comprise, for instance, the top level of a group of data and may therefore be a starting point from which access to all associated data structures begin. All of the pointers 204a-204n from the root 206 are fat pointers that are directed to different nodes extending from the root 206. The fat pointer 204a has been depicted as including a width of four tuples; however, the fat pointers 204a-204n may include any reasonably suitable number of tuples, such as two or more tuples. In the example shown in FIG. 2, when the fat pointer 204a of the accessor 202 is dereferenced, the pointer 208c with version number 4 will be accessed because that version is the closest to the most recent version number, in this case version 5, stored in the accessor 202. It may not be necessary for the fat pointer 204a to exactly match the version number of the accessor 202 because the update that caused the version to increment to version 5 could have been made in another portion of the data structure. For similar reasons, the fat pointer 204a depicted in the example of FIG. 2 doesn't have a pointer with a version number 2.

In an embodiment, multiple versions of pointers 208a-208d may point to the same data. For example, the pointer 208b corresponding to version number 3 and the pointer 208c corresponding to version number 4 may both point to the same node A 210a. Further, a fat pointer 204a may contain a least recent or obsolete pointer 208a that will be reused for the next update. For example, the pointer 208a corresponding to version 1 points to a special type of node having a NULL value. In addition, the fat pointer 204a contains a pointer 208d with a version that is more recent than the version of the accessor 202 that points to a node B 210b. This pointer 208d represents an ongoing update that has not been committed to the data store 118 yet. If the update fails or is aborted, all access to this data structure will never follow the pointer 208d corresponding to version 6 as the version is greater than the version of the accessor 202. However, once the update is committed to the data store 118, the pointer 208d corresponding to the current version will override all the other pointers 208a-208c.

The accessor 202 may be implemented as a 64-bit version number and a fat pointer 204a to provide atomicity. The fat pointers 204a-204n are implemented as a multi-versioned pointer to support atomic updates. In addition, the fat pointers 204a-204n may be implemented in C++ as a fat pointer class and by overloading the pointer dereference and assignment operators for a durable data structure. In addition, a helper library and macros that simplify the creation, access, and update of fat pointers may be created. In an embodiment, the fat pointer 204a may contain at least two tuples to store the last consistent version and an ongoing uncommitted update. If an implementation requires access to a significantly larger number of versions, a search tree, or other linked data structure, may be used within each fat pointer 204a for efficient access to objects.

The data structure managing apparatus 102 may store the built/updated data structures in the data store 118, which may also store the object. According to an embodiment, the data store 118 may comprise non-volatile byte-addressable memory, such as, battery-backed random access memory (RAM), phase change RAM (PCRAM), Memristor, and the like. In addition, or alternatively, the data store 118 may comprise a device configured to read from and write to external removable media, such as a removable PCRAM device. Although the data store 118 has been depicted as being internal or attached to the data structure managing system 100, it should be understood that the data store 118 may be remotely located from the data structure managing system 100. In this example, the data structure managing system 100 may access the data store 118 through a network connection, the Internet, etc.

As further shown in FIG. 1, the data structure managing apparatus 102 includes a user interface module 104, an accessor module 106, a fat pointer module 108, a committing module 110, and an updating module 112. The modules 104-112 may comprise software modules, hardware modules, or a combination of software and hardware modules. Thus, in one embodiment, one or more of the modules 104-112 comprise circuit components. In another embodiment, one or more of the modules 104-112 comprise software code stored on a computer readable storage medium, which the processor 120 is configured to execute. As such, in one embodiment, the data structure managing apparatus 102 comprises a hardware device, such as, a computer, a server, a circuit, etc. In another embodiment, the data structure managing apparatus 102 comprises a computer readable storage medium upon which software for performing the functions of the modules 104-112 is stored. The various functions that the data structure managing apparatus 102 performs are discussed in greater detail hereinbelow.

According to an embodiment, the data structure managing apparatus 102 is configured to implement a versioning scheme for linked data structures and to support a durable data structure on current hardware without the use of a write-ahead undo or redo log, and without making extensive use of a copy-on-write scheme.

Figure 3:
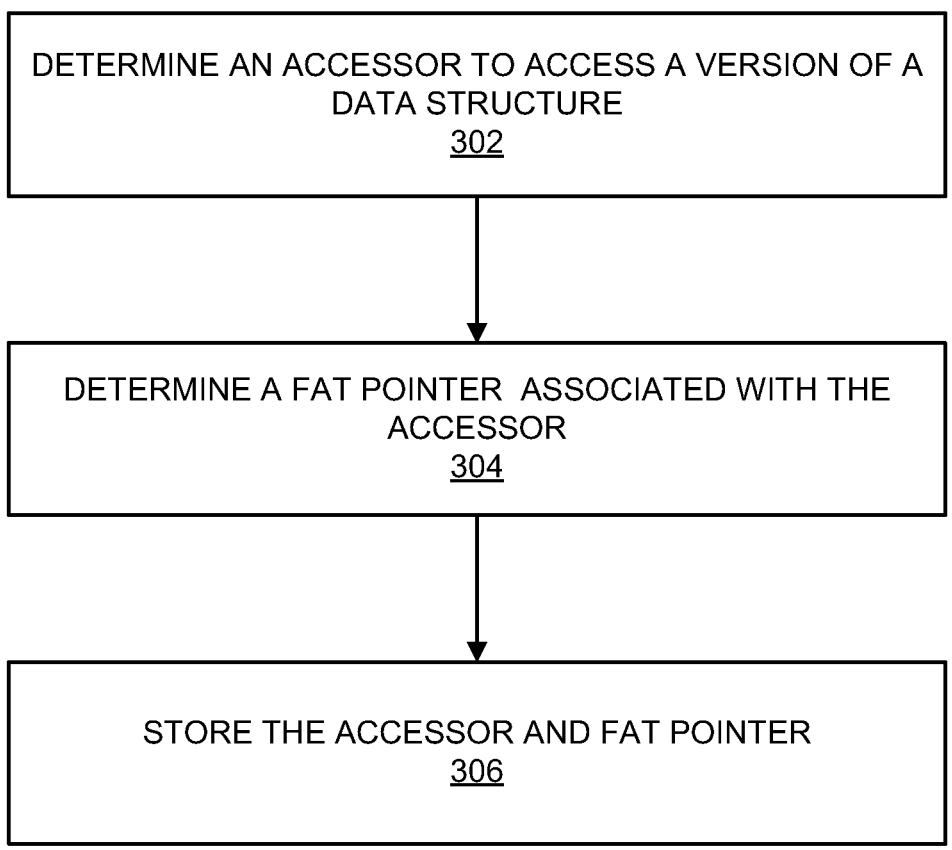
FIGS. 3 and 4, respectively, illustrate flow diagrams of methods for managing a data structure in a memory, according to example embodiments of the present invention.
Figure 4:
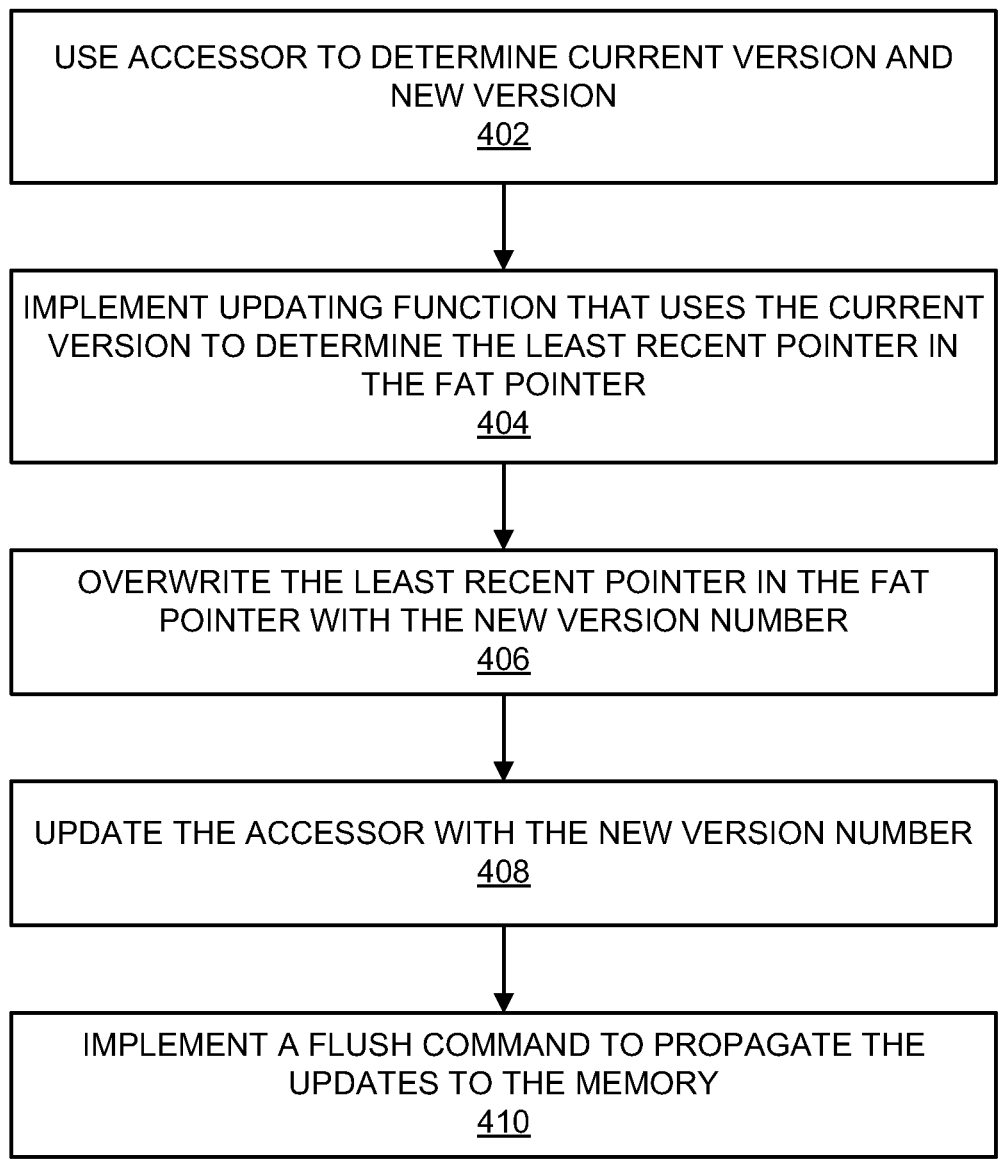

Various manners in which the modules 104-112 of the data structure managing apparatus 102 may be implemented are described in greater detail with respect to FIGS. 3 and 4, which depict flow diagrams of methods 300 and 400 for managing a data structure in a memory, according to embodiments of the invention. It should be apparent to those of ordinary skill in the art that the methods 300 and 400 represent generalized illustrations and that other steps may be added or existing steps may be removed, modified or rearranged without departing from the scopes of the methods 300 and 400.

The descriptions of the methods 300 and 400 are made with particular reference to the data structure managing apparatus 102 depicted in FIG. 1 and the diagram 200 depicted in FIG. 2. It should, however, be understood that the methods 300 and 400 may be implemented in an apparatus that differs from the data structure managing apparatus 102 and the diagram 200 without departing from the scopes of the methods 300 and 400.

With reference first to the method 300 in FIG. 3, at step 302, an accessor 202 to access a version of the data structure is determined, for instance, by the accessor module 106. As discussed above, the accessor 202 includes a version number and pointer. In one example, the version number corresponds to the most recent version of the data structure. In instances where a new data structure is stored in a memory or is initially accessed, the accessor module 106 may determine the accessor 202 by generating the accessor 202 at step 302. In other instances in which the accessor 202 has previously been generated, the accessor module 106 may determine the accessor 202 by updating the accessor 202 at step 302.

Step 302 may be implemented in response to receipt of an instruction to store, update and/or access a data structure. The instruction may include an instruction to update the data structure in response to the data structure managing apparatus 102 receiving a new object or node to be included in the data structure. As discussed above, when new data is to be included, the least recent or oldest pointer may be overwritten with a new version number. More particularly, the update module 112 may implement an update function that uses the current version number to determine the least recent pointer in the fat pointer. In addition, the update module 112 may update the data structure following the committing of an update of the data structure, which causes the pointer in a common tuple with a new version number to overwrite previous pointers. Moreover, the updating module 112 may update the pointer and version of the accessor 202 in response to the update of the data structure being committed to the non-volatile memory, such as, the data store 118.

At step 304, a fat pointer 204a associated with the accessor 202 is determined, for instance, by the fat pointer module 108. The fat pointer module 108 may generate the fat pointer 204a if the data structure is being created or initially accessed, for instance by allocating new memory storage in the data store 118. Otherwise, the fat pointer module 108 may determine the fat pointer 204a of the data structure if the data structure and fat pointer 204a already exist. In any regard, the fat pointer 204a includes a collection of version number and pointer tuples corresponding to at least one node extending from the root 206. In addition, the fat pointer 204a connects a plurality of data/nodes in the data structure together. As discussed above, the fat pointer 204a allows a system to maintain multiple versions of the data structure. More particularly, the fat pointer 204a may include a plurality of identification sets or tuples, in which each of the identification sets or tuples includes a pointer and a version of the data structure. The pointer may be a memory pointer and the version may include at least one of an old version number, a current version number, and a new version number of the data structure.

At step 306, the accessor 202 and the fat pointer 204a are stored in a memory, such as, the data store 118. For example, the accessor 202 and the fat pointer 204a may be first stored onto the data store 118 using a flush command. More particularly, for instance, the accessor 202 and the fat pointer 204a may be stored onto the persistent memory 118 from the processor 120 cache through implementation of the flush command.

Turning now to FIG. 4, the method 400 may be implemented to update a data structure, according to an embodiment of the invention. As such, the method 400 may represent a more detailed description of the method 300 in FIG. 3, in which the data structure has previously been stored in the data store 118 and an accessor 202 and fat pointer 204a already exist.

At step 402, the accessor 202 is used to determine the current version and a new version number that would be committed for an upcoming update of the data structure, for instance, by the accessor module 106. The accessor module 106 may determine the current version of the data structure by determining the version number of the accessor 202.

At step 404, an updating function is implemented, for instance, by the fat pointer module 108. More particularly, for instance, the updating function is configured to use the current version of the data structure to determine the leas recent or oldest pointer in the fat pointer 204a.

At step 406, the least recent pointer in the fat pointer 204a is overwritten with the new version number, for instance, by the fat pointer module 108. In addition, at step 408, the accessor 202 is updated with the new version number, for instance, by the accessor module 106. Moreover, at step 410, a flush command is implemented to propagate the updates to the non-volatile memory. Generally speaking, the flush command is implemented in hardware, software or a combination of hardware and software and guarantees that the new data has been propagated from the processor 120 cache to the memory 118. In addition, a flush command uses processor primitives to ensure that the selected data is pushed to main memory/ storage 118, which makes the selected data persistent.

According to an embodiment, the linked data structure disclosed herein comprises a search tree comprising left and right sides extending from a top root node. In addition, the following table depicts an algorithm is an example of a manner in which a node may be inserted into the search tree according to an embodiment.

TABLE 1

Binary Search Tree Insertion

```
Input: ac: accessor, n: node
  1      begin insert node(ac, n)
  2        v ← version[ac]
  3        v' ← v+1
  4        y ← 0
  5        x ← deref(ac, v)
  6        while x ≠ 0 do
  7          y ← x
  8          if key[n] < key[x] then
  9            x ← deref(left[x], v)
 10          else x ← deref(right[x], v)
 11        if y = 0 then            // Empty Tree
 12          update(ac, v', n)
 13        else if key[n] < key[y] then
 14          update(left[y], v', n)
 15        else update(right[y], v', n)
 16        version[ac] ← v'
 17        flush(version[ac])
 18      end
```

In lines 2-3 of Table 1, the algorithm uses the accessor 202 to determine the current consistent version (v=0) and the new version number that would be committed for this update (v'=1). In line 5, the algorithm also uses the deref( ) function to get a pointer to the root of the searchtree. The deref function, shown in Table 2 below, uses the current version (v) to find the more recent pointer in the accessor's pointer.

The algorithm then descends down the search tree until the parent node for the insertion is found. If the tree is empty (line 11), a pointer with version v' in the accessor that points to the new node as the root is created. Otherwise, depending on the value of the new node's parent, the pointer will be added as either the left or right child in the search tree. All of the three possible pointer updates use the update( ) helper function. The update function, as also described in Table 2 below, finds the oldest version in the parent node's fat pointer and updates it with a pointer to the new node with version v'. As the updated fat pointer might still be cached within the processor, a flush command is then executed to propagate the write to non-volatile memory.

TABLE 2

Fat Pointer Dereference and Update

```
Input: fp: fat pointer, v: version
 1      begin deref(fp, v)
 2          max ← 0
 3          for I ← 0 to PointerWidth do
 4              if version[fp[i]] ≤ v and version[fp[i]] ≥ max
                then
 5                  index ← i
 6                  max ← version[fp[i]]
 7          return pointer[fp[index]]
 8      end
Input: fp: fat pointer, v: version, p: pointer
 9      begin update(fp, v, p)
10          min ← version[fp[0]]
11          for I ← 0 to PointerWidth do    // Find oldest
12              if version[fp[i]] ≤ min then
13                  index ← i
14                  min ← version[fp[i]]
15          pointer[fp[index]] ← p
16          version[fp[index]] ← v
17          flush(fp[index])
18      end
```

At this point, even though the pointer to the new node is persistent, the update has not been made globally visible yet. A power failure at this point would render the previous writes invalid but, as the data structure hasn't acknowledged the insert to the caller, no silent data loss can occur. To complete the insert and make it permanent, the accessor's version number is atomically updated to v' and flushed to non-volatile memory (lines 16-17). Although Table 2 uses a linear search, the steps depicted therein may also be implemented using a variety of other search techniques, such as, tree-based searchers.

Some or all of the operations set forth in the figures may be contained as a utility, program, or subprogram, in any desired computer readable storage medium. In addition, the operations may be embodied by computer programs, which can exist in a variety of forms both active and inactive. For example, they may exist as software program(s) comprised of program instructions in source code, object code, executable code or other formats. Any of the above may be embodied on a computer readable storage medium, which include storage devices.

Exemplary computer readable storage media include conventional computer system RAM, ROM, EPROM, EEPROM, and magnetic or optical disks or tapes. Concrete examples of the foregoing include distribution of the programs on a CD ROM or via Internet download. It is therefore to be understood that any electronic device capable of executing the above-described functions may perform those functions enumerated above.

Figure 5:
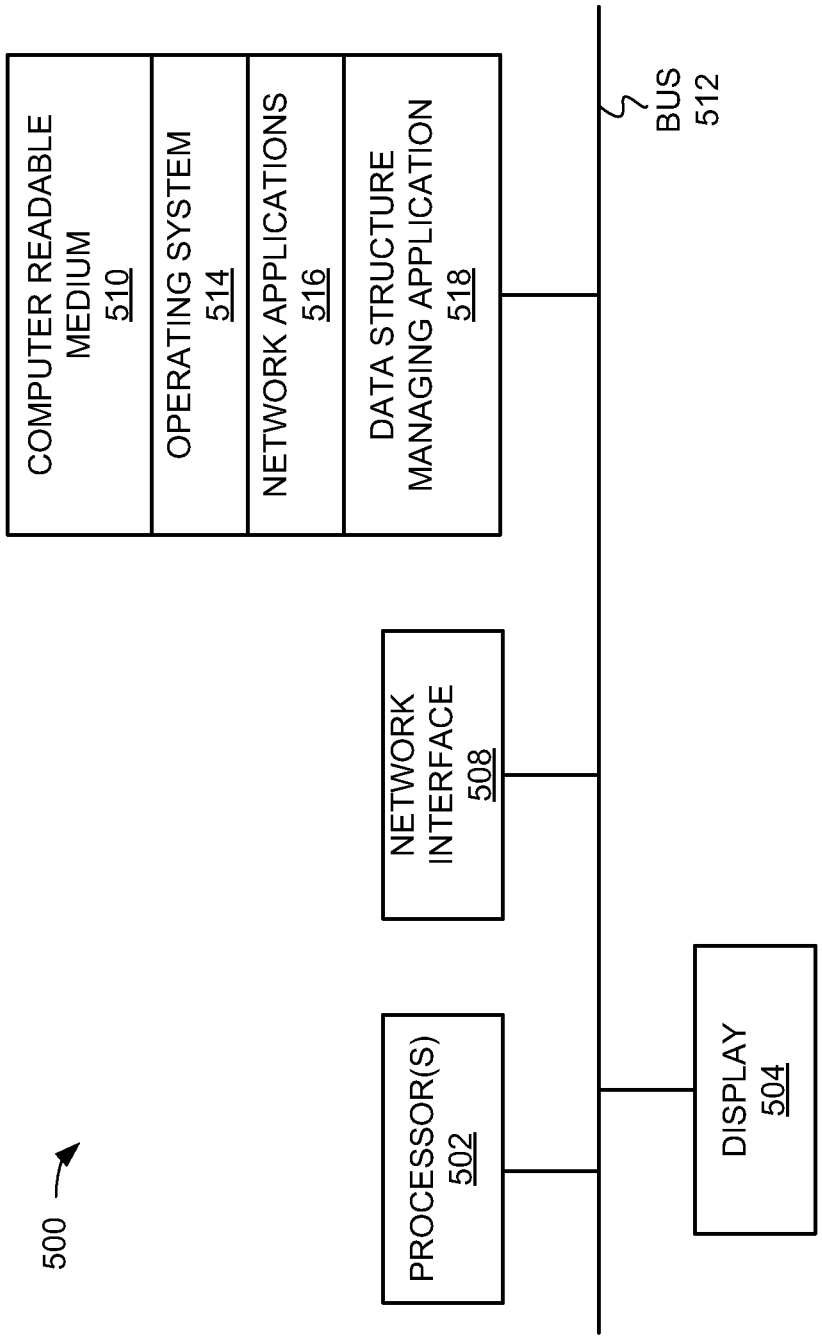
FIG. 5 shows a of a computing device, which may be employed as a platform for implementing or executing one or more of the processes depicted in FIGS. 3 and 4, according to an example embodiment of the present invention.

Turning now to FIG. 5, there is shown a computing device 500, which may be employed as a platform for implementing or executing one or more of the processes depicted in FIGS. 3 and 4, in accordance with embodiments of the present invention. It should be understood that the illustration of the computing device 500 is a generalized illustration and that the computing device 500 may include additional components and that some of the components described may be removed and/or modified without departing from a scope of the computing device 500.

The device 500 includes one or more processors 502, such as a central processing unit; one or more display devices 504, such as a monitor; one or more network interfaces 508, such as a Local Area Network (LAN), a wireless 802.11x LAN, a 3G mobile WAN or a WiMax WAN; and one or more computer-readable mediums 510. Each of these components is operatively coupled to one or more buses 512. For example, the bus 512 may be an EISA, a PCI, a USB, a FireWire, a NuBus, or a PDS.

The computer readable medium 510 may be any suitable medium that participates in providing instructions to the processor 502 for execution. For example, the computer readable medium 510 may be non-volatile media, such as an optical or a magnetic disk; volatile media, such as memory; and transmission media, such as coaxial cables, copper wire, and fiber optics. Transmission media can also take the form of acoustic, light, or radio frequency waves. The computer readable medium 510 may also store other software applications, including word processors, browsers, email, Instant Messaging, media players, and telephony software.

The computer-readable medium 510 may also store an operating system 514, such as Mac OS, MS Windows, Unix, or Linux; network applications 516; and a data structure managing application 518. The operating system 514 may be multi-user, multiprocessing, multitasking, multithreading, real-time and the like. The operating system 514 may also perform basic tasks such as recognizing input from input devices, such as a keyboard or a keypad; sending output to the display 504 and the design tool 506; keeping track of files and directories on medium 510; controlling peripheral devices, such as disk drives, printers, image capture device; and managing traffic on the one or more buses 512. The network applications 516 includes various components for establishing and maintaining network connections, such as software for implementing communication protocols including TCP/IP, HTTP, Ethernet, USB, and FireWire.

The data structure managing application 518 provides various software components for building/updating a data structure for a non-volatile memory, as described above. In certain embodiments, some or all of the processes performed by the application 518 may be integrated into the operating system 514. In certain embodiments, the processes may be at least partially implemented in digital electronic circuitry, in computer hardware, firmware, software, or in any combination thereof.

Although described specifically throughout the entirety of the instant disclosure, representative embodiments of the present invention have utility over a wide range of applications, and the above discussion is not intended and should not be construed to be limiting, but is offered as an illustrative discussion of aspects of the invention.

What has been described and illustrated herein are embodiments of the invention along with some of their variations. The terms, descriptions and figures used herein are set forth by way of illustration only and are not meant as limitations. Those skilled in the art will recognize that many variations are possible within the spirit and scope of the invention, wherein the invention is intended to be defined by the following claims—and their equivalents—in which all terms are mean in their broadest reasonable sense unless otherwise indicated.

What is claimed is:

1. A method for managing data in a data structure in a memory, said method comprising:

determining, by at least one processor, an accessor to access a version of the data in the data structure, wherein the accessor includes a version number and a fat pointer, wherein the version number corresponds to a most recent version of the data stored in the data structure, and the fat pointer comprises a collection of version number and pointer tuples comprising pointers corresponding to at least one node extending from a root of the data structure to enable multiple versions of a linked-data structure to be maintained, the collection of version number and pointer tuples including a new version number that represents an ongoing update of data not yet committed to the memory;

overwriting previous pointers with a pointer in a common tuple with the new version number to commit the ongoing update to the memory; and updating the fat pointer and version of the accessor in response to the overwriting of the previous pointers.

2. The method according to claim 1, wherein determining the accessor further comprises generating the collection of version number and pointer tuples, the collection comprising a plurality of identification sets, wherein each of the identification sets includes a version number and pointer tuple.

3. The method according to claim 2, wherein a plurality of the identification sets include pointers that correspond to the same at least one node.

4. The method according to claim 2, wherein generating the fat pointer further comprises generating the fat pointer such that each of the version numbers contained in the plurality of identification sets comprises at least a most recent version number and a new version number, wherein the new version number is greater than the version number of the accessor.

5. The method according to claim 1, wherein the data structure is a linked-data structure comprising a search tree extending from a top root node.

6. The method according to claim 1, further comprising:
determining, by the accessor, a current version and the new version number that would be committed for the update;
implementing an updating function, wherein the updating function uses the current version to determine a least recent pointer in the fat pointer;
wherein overwriting the previous pointers further comprises overwriting the least recent pointer with the new version number;
wherein updating the accessor further comprises updating the accessor with the new version number; and
implementing a flush command to propagate the updates to the memory.

7. The method according to claim 1, wherein the memory comprises a non-volatile byte addressable memory.

8. An apparatus for managing data in a data structure in a memory, said apparatus comprising:
a memory storing one or more modules to determine an accessor to access a version of the data in the data structure, wherein the accessor includes a version number and a fat pointer, wherein the version number corresponds to a most recent version of the data, wherein the fat pointer comprises a collection of version number and pointer tuples comprising pointers corresponding to at least one node extending from a root of the data structure to enable multiple versions of a linked-data structure to be maintained, wherein the collection of version number and pointer tuples includes a new version number that represents an ongoing update of data that has not yet been committed to the memory, and wherein the one or more modules are further to commit an update of the data in the data structure; and
a processor to execute the one or more modules, wherein the processor is to:
overwrite previous pointers with a pointer in a common tuple with the new version number to commit the ongoing update to the memory; and
update the fat pointer and version of the accessor.

9. The apparatus according to claim 8, wherein the one or more modules are further to generate the fat pointer to include a plurality of identification sets, wherein each of the identification sets includes a version number and pointer tuple corresponding to the at least one node.

10. The apparatus according to claim 9, wherein the one or more modules are further to generate the fat pointer such that each of the version numbers contained in the plurality of identification sets comprises at least the most recent version number and the new version number, wherein the new version is greater than the version number of the accessor.

11. The apparatus according to claim 8, wherein the data structure is a linked-data structure.

12. The apparatus according to claim 9, wherein the one or more modules are further to use the accessor to determine a current version and the new version number that would be committed for an upcoming update, to implement an updating function, wherein the updating function uses the current version to determine a least recent pointer in the fat pointer, to overwrite the least recent pointer with the new version number, to update the accessor with the new version number, and to implement a flush command to propagate the update to the memory.

13. A non-transitory computer readable storage medium on which is embedded one or more computer programs, said one or more computer programs implementing a method for managing data in a data structure in a memory, said one or more computer programs comprising a set of instructions to:
determine an accessor to access a version of the data in the data structure, wherein the accessor includes a version number and a fat pointer, wherein the version number corresponds to a most recent version of the data in the data structure, and wherein the fat pointer comprises a collection of version number and pointer tuples comprising pointers corresponding to at least one node extending from a root of the data structure to enable multiple versions of a linked-data structure to be maintained, wherein the collection of version numbers includes a new version number that represents an ongoing update of data that has not yet been committed to the memory;
overwrite previous pointers with a pointer in a common tuple with the new version number to commit the ongoing update to the memory; and
update the fat pointer and version of the accessor.

14. The method according to claim 1, wherein the fat pointer comprises at least two tuples to store a last consistent version and an ongoing uncommitted update.

15. The apparatus according to claim 8, wherein the fat pointer comprises at least two tuples to store a last consistent version and an ongoing uncommitted update.

16. The non-transitory computer readable storage medium according to claim 13, wherein the fat pointer comprises at least two tuples to store a last consistent version and an ongoing uncommitted update.

* * * * *